(12) United States Patent
Hattori

(10) Patent No.: US 7,107,922 B2
(45) Date of Patent: Sep. 19, 2006

(54) FENDER AND MANAGEMENT SYSTEM THEREOF

(75) Inventor: Yutaka Hattori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 184 days.

(21) Appl. No.: 10/259,414

(22) Filed: Sep. 30, 2002

(65) Prior Publication Data

US 2003/0063910 A1    Apr. 3, 2003

Related U.S. Application Data

(63) Continuation of application No. 09/319,948, filed as application No. PCT/JP98/04751 on Oct. 20, 1998, now Pat. No. 5,975,225.

(30) Foreign Application Priority Data

Oct. 22, 1997   (JP)   .............................. H9-289919

(51) Int. Cl.
    *F16G 11/00*   (2006.01)
    *A01K 5/02*    (2006.01)

(52) U.S. Cl. ........................................ 114/219; 705/28

(58) Field of Classification Search ................ 705/28; 114/219; 340/984, 572.8
    See application file for complete search history.

(56) References Cited

U.S. PATENT DOCUMENTS

| | | | | |
|---|---|---|---|---|
| 2,960,055 | A | * | 11/1960 | Tomek ........................ 114/219 |
| 3,837,380 | A | * | 9/1974 | Davies ........................ 141/279 |
| 4,763,126 | A | * | 8/1988 | Jawetz ........................ 340/985 |
| 5,007,285 | A | * | 4/1991 | Dahlen et al. ................. 73/170 |
| 5,461,236 | A | * | 10/1995 | Gram et al. ............. 250/461.1 |
| 6,058,374 | A | * | 5/2000 | Guthrie ........................ 705/28 |
| 6,144,301 | A | * | 11/2000 | Frieden .................... 340/572.8 |

* cited by examiner

FOREIGN PATENT DOCUMENTS

WO       96/35608    * 11/1996

OTHER PUBLICATIONS

Lee, Julian, "The fender bender: Yvonne Mason's skill at organisation led her into the unlikely world of supplying protective equipment for docking ships." The Guardian, Jan. 15, 2000.*

*Primary Examiner*—Michael Cuff
(74) *Attorney, Agent, or Firm*—Rader, Fishman & Grauer PLLC

(57) ABSTRACT

The present invention relates to a fender, which is used as cushioning material mainly at the time of a ship being moored, and a management system thereof. A transponder is mounted in a fender 1 that is an object to be managed, and an ID code is read by the transponder in the fender 1 being accessed by terminals 2A through 2D provided in areas where are areas to be managed and each have one or more terminals. Historical information showing an installed place and an installed period of the fender 1 and individual update information including the ID code is transferred to a control system 4 through communication networks 6A through 6D. The control system 4 not only stores manufacturing information and historical information of all the fenders 1 that are objects to be managed, but also updates the historical information on the basis of the individual update information received from the terminal 2. Furthermore, the control system 4 displays the manufacturing information and historical information of a specific fender 1 designated by an operator. Thereby, it is possible to perform management of fenders, installed in being dispersed, in real time.

29 Claims, 14 Drawing Sheets

Fig. 9

| 1 | Serial number | 10X15XX15X08 |
| --- | --- | --- |
| 2 | Rated dimensions | 1000mmD×15000mmL |
| 3 | Initial internal pressure | $0.8 kgf/cm^2$ |
| 4 | Model | B type |
| 5 | Cover structure | Gray 1.5mm |
| 6 | Manufacturing date | 15 September 1997 |
| 7 | Customer | XXXXXXXX |
| 8 | Test report | AXX97-007 |
| 9 | Manufacturing specifications | XXXX-0001 |
| 10 | Remarks | Compression test performed |

Fig.10

| 1 | Serial number | 10X15XX15X08 |
|---|---|---|
| 2 | Initial installation date | 30 November 1997 |
| 3 | Initial installation place | XXXXXX |
| 4 | Use history | 7 December 1997: 1st XXXX<br>8 February 1997: Total 35 STS since 7/12/97<br>10 March 1997: Transferred to XXXXXXX |
| 5 | Check and inspection record | 2 January 1998: Good |
| 6 | Repair record | 23 February 1999: Cover scratches repaired |
| 7 | Miscellaneous | XXXXXXX    ABCDEFG |

FENDER AND MANAGEMENT SYSTEM THEREOF

This application is a continuation of U.S. application Ser. No. 09/319,948, filed Jun. 18, 1999, now issued as U.S. Pat. No. 5,975,225, which claims the benefit of and is a continuation of international application No. PCT/JP98/04751 filed Oct. 20, 1998, now issued as WO99/20845, which claims the benefit of foreign application JP H9-289919, filed Oct. 22, 1997.

TECHNICAL FIELD

The present invention relates to a fender, which is used as cushioning material mainly at the time of a ship being moored, and a management system thereof.

BACKGROUND ART

Conventionally, fenders are used for buffering shock arising in a ship, a quay, or ships when the ship comes alongside a structure such as the quay or the ship comes alongside another ship on the sea.

A fender is classified according to material buffering shock: a rubber fender buffering shock with rubber; a pneumatic fender buffering shock with air; a foam fender buffering shock with foam material; or the like. In addition, the fender is classified according to usage: a fixed fender used with being fixed with bolts to a structure such as a quay; and a floating fender used with being floating on the sea and moored with a chain or the like to a quay or a ship.

Owners of these fenders are various, for example, port-related groups, ship-holding companies, rental companies of fenders and oil companies, and there are many fender manufactures in the world.

Therefore, various types of fenders are intermixed in the same port. In particular, since the floating fenders are easily detached, the floating fenders are resold or borrowed and lent, are carried with being embarked on ships, or are used with being passed around many ships. Therefore, the floating fenders can not stay at a fixed location, but can move in the whole world in many cases.

In addition, since the fenders are expensive, the fenders are used for the long time such as more than ten years, and are used after repair in case of slight damages.

The fenders bear an important part in ships safely coming alongside quays and ships. The ships and quays are damaged if the fenders do not play the part, and hence it can cause serious accidents.

Therefore, for the holding companies and users of the fenders, it is very important to identify each fender and recognize manufacturing items such as a manufacturing date and a manufacturing place, specifications and structure, characteristics such as buffering capability, information regarding history such as repair and used places of each fender in real time, and to manage many fenders so as to use only the normal fenders in any time.

Nevertheless, it has been not easy to manage the fenders in a location where various fenders are intermixed as described above, and in particular, it was further difficult to manage the floating fenders used over the world with being moved.

An object of the present invention is in consideration of the above problems to provide a fender and a fender management system that make it possible to easily manage the fenders installed in being dispersed.

DISCLOSURE OF THE INVENTION

In order to attain the above object, the present invention comprises information memory means for storing predetermined information, and information read means for reading information stored in the information memory means, and a fender comprises a transponder that can access the information read means by wireless. In addition, a fender management system is configured, the system comprising: this fender; a terminal which is accessing the information memory means of the transponder, provided in the fender, by wireless; a control system that can communicate with this terminal, and stores information inherent in each fender, which is obtained through the terminal, with making the information correspond to each fender; and a computer that can communicate with the control system. The control system reads information from the information memory means of a transponder through the terminal, reads information of a fender stored in the computer by communicating with the computer, receives information inherent in each fender from the computer, and manages fenders, installed in a specific area, a wide area, or a plurality of remote areas, on the basis of this information above.

It is possible that the information memory means of a transponder includes information such as identification information inherent in each fender for identifying the fender, identification information inherent in each transponder for identifying the transponder mounted in a fender, and manufacturing information, historical information, and characteristics of the fender.

In addition, in order to manage in a specific area, a system comprising the fender, and a terminal receiving and transmitting information by communicating with a transponder, provided in the fender, by wireless is configured, and the terminal comprises: information memory means for storing information regarding the fender that is an object to be managed; reception means for receiving information transmitted from the transponder; information update means for updating information, stored in the information memory means, on the basis of this information received; and information display means for displaying information of the fender designated by an operator.

Furthermore, a system to which a control system having large information memory capacity is added is configured so that, the system can receive and transmit information between the transponder and control system through the terminal, and can manage plenty of information for many fenders by using the control system.

According to the management system, a transponder is mounted in a fender, and hence it is possible to automatically read the predetermined information stored in the information memory means by accessing the transponder, and to manage each fender by using this information.

In addition, even if a location is apart from a fender in some extent, it is possible to access a transponder, to simplify management work, and to prevent an artificial human error on management.

Furthermore, by providing information write means for being capable of accessing a transponder by wireless and for writing information to the information memory means of the transponder, a fender itself can hold unique information relating to the fender.

In addition, a transponder comprises: reception means for receiving an electromagnetic wave having a first frequency; energy conversion means for converting the energy of the electromagnetic wave, received by the reception means, into electric energy; and transmission means for transmitting information, read from the information memory means by the information read means, by an electromagnetic wave having a second frequency. By making the transponder operate by electric energy obtained from the energy conversion means, it becomes possible for the transponder to semipermanently operate and to simplify the maintenance of the transponder.

Furthermore, as a concrete system configuration, at least one transponder, storing identification information inherent in a fender, is mounted in the fender that is an object to be managed. The control system stores information inherent in each fender that is an object to be managed, for example, manufacturing information such as rated dimensions, an initial internal pressure, a manufacturing date, and a customer name, and, for example, historical information such as an initial installation date, an installed period, subsequent installed places and installed periods, and check, inspection, and repair records. This information can be displayed by designating a specific fender.

Furthermore, if the installed place or the like of a fender is changes, the management system reads identification information by accessing the transponder of the fender with a terminal, and updates the historical information stored in the control system since the terminal generates the individual update information including this historical information and identification information by inputting to the terminal the historical information to be added. Thereby, it is possible to grasp information regarding an individual fender, to easily perform real-time management, and to prevent an artificial error on the management.

In addition, since necessary information of each fender is stored in the control system by locating a terminal in an area where fenders, which are objects to be managed, are installed and providing at least one control system according to necessity, it is possible to grasp historical data such as installed places and installed periods of the fenders immediately and exactly.

Furthermore, by performing information transfer between the control system and computer or between the terminal and control system through a communication network such as telephone lines, internets, wireless communications, and satellite communications, it is possible to update management information in real time without depending on distance between these installed places.

In addition, if the information memory means of a transponder stores identification information inherent in the transponder such as an ID code inherent in each transponder, the terminal or control system converts this ID code into a serial number of the fender by using a corresponding table, and generates individual update information including this serial number and historical information; manages information by using the serial number as the identification information of the fender. Thereby, it is possible to easily associate each fender with manufacturing information thereof.

Furthermore, by storing manufacturing drawings of each fender in manufacturing information memory means of the control system, it is possible to easily repair the fender on the basis of manufacturing drawings when urgent repair is necessary.

In addition, by operator's command input, it is possible to grasp the location of each fender at the time of maintenance or the like by displaying a map or a photograph of the installed place and its vicinity of the installed place of an arbitrary fender on the basis of the historical information of the fender designated in the control system.

Furthermore, by operator's command input, it is possible to easily perform movement plan such as the change of the installed place of a fender by displaying the installation state of the fender in a designated arbitrary area such as installed places, the number of fenders, kinds of the fenders, which are installed, on the basis of the historical information of the fenders in the control system.

BRIEF DESCRIPTION OF THE DRAWINGS

FIG. 9 is a drawing for explaining the contents of manufacturing information in the first embodiment of the present invention;

FIG. 10 is a drawing for explaining the contents of historical information in the first embodiment of the present invention;

BEST MODE FOR CARRYING OUT THE INVENTION

Hereinafter, an embodiment of the present invention will be described with reference to drawings.

Figure 1:
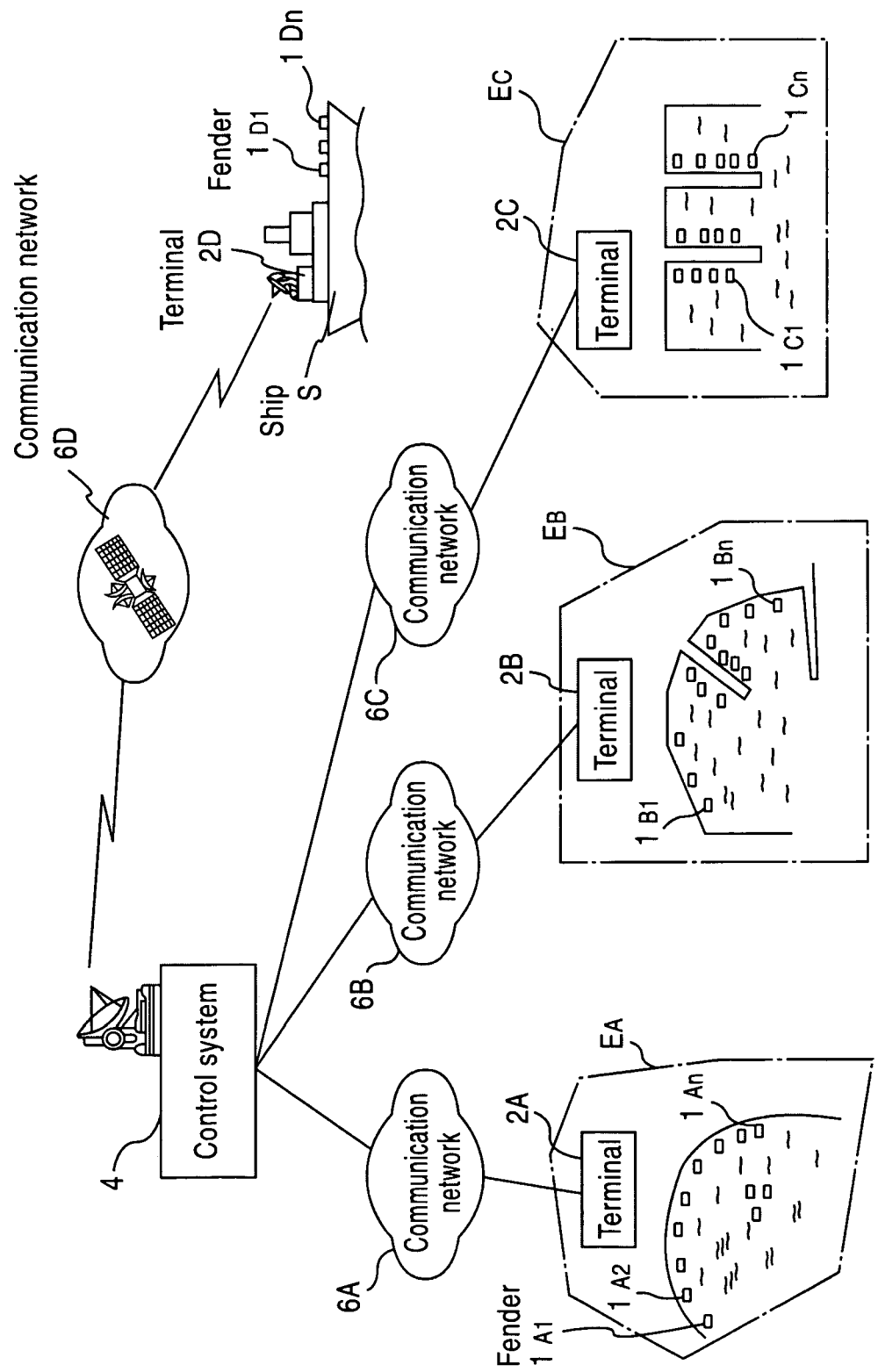
FIG. 1 is a block diagram showing a fender management system in a first embodiment of the present invention.

FIG. 1 is a block diagram showing a fender management system in a first embodiment of the present invention. In FIG. 1, symbols 1's ($1_{A1}$–$1_{An}$, $1_{B1}$–$1_{Bn}$, $1_{C1}$–$1_{Cn}$, and $1_{D1}$–$1_{Dn}$) denote pneumatic fenders (hereinafter, these are called fenders) that are objects to be managed, symbols 2A through 2D denote terminals, symbol 4 denotes a control system, and symbols 6A through 6D denote communication networks.

Figure 2:
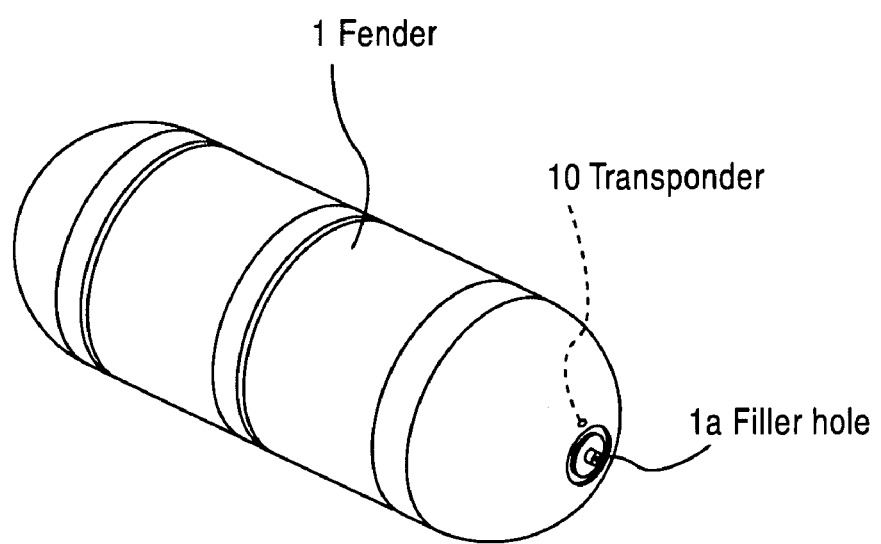
FIG. 2 is an outside view showing a fender in the first embodiment of the present invention.
Figure 3:
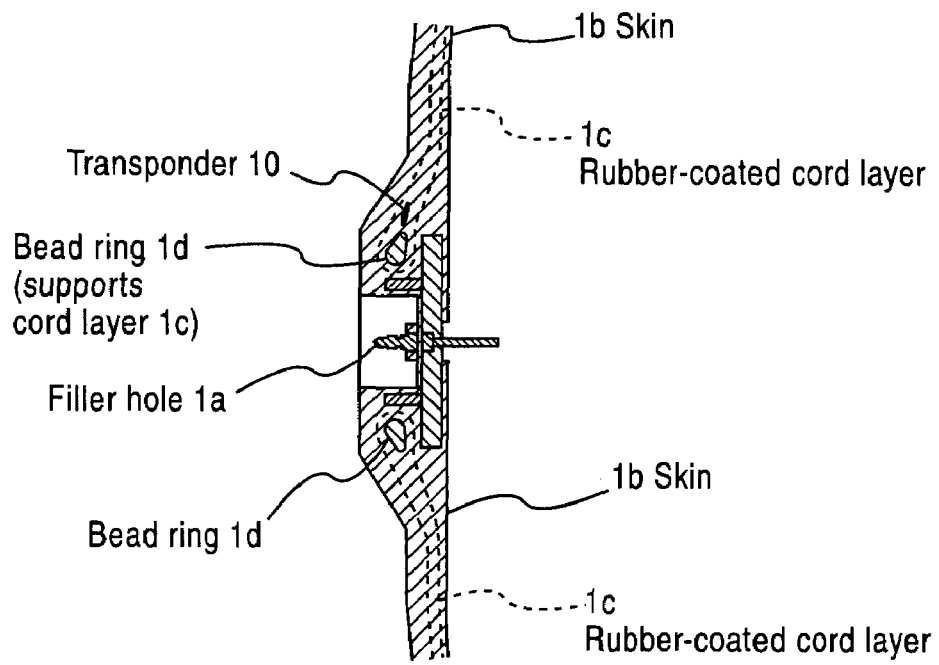
FIG. 3 is a partial cross-sectional view showing a mounting position of a transponder in the fender in the first embodiment of the present invention.
Figure 4:
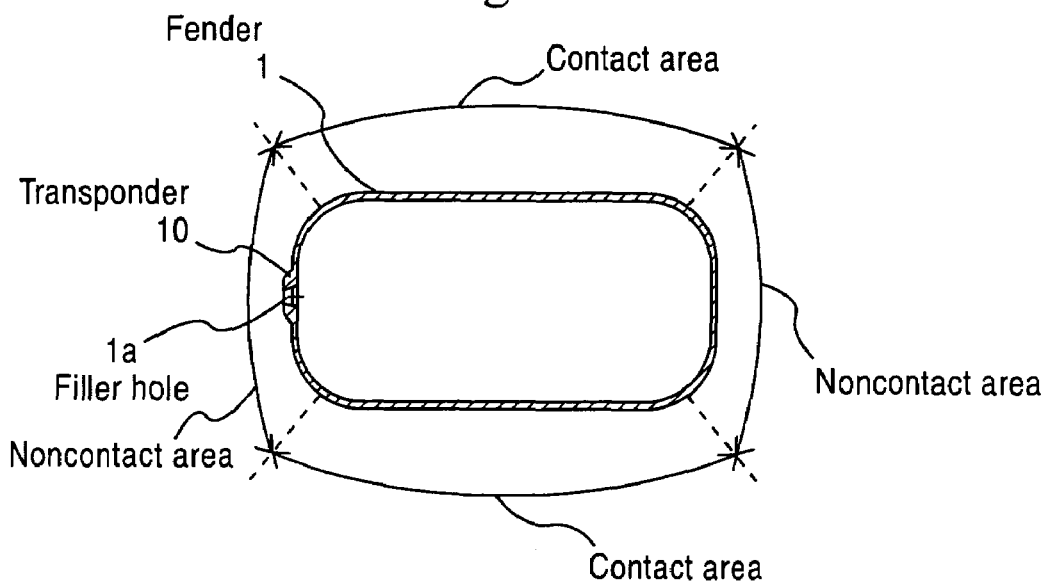
FIG. 4 is a block diagram for explaining contact areas and noncontact areas of the fender in the first embodiment of the present invention.

The fender 1 is used as cushioning material for a ship or the like by being fixed in an underwater structure such as a quay and a bridge pier or being floated on the surface of the water. For example, as shown in FIGS. 2 through 4, the fender 1 has a barrel-like shape obtained by sealing both ends of a rubber tube that is 3–4 m long and 1–2 m in diameter, and has a filler hole 1a of air in an end, and is filled with air of the predetermined internal pressure through this filler hole 1a. Furthermore, at least one transponder 10 accessible by an electromagnetic wave is provided in the vicinity of the filler hole 1a.

Here, in order to reduce shock to the transponder 10 and prevent damage of the transponder 10, the inside or internal surface of a skin 1b made of the rubber tube is preferable as a mounting position of the transponder 10. In this embodiment, the transponder 10 is installed near by a bead ring 1d supporting cord tension of a rubber-coated cord layer 1c embedded in the skin 1b as shown in FIG. 3. In addition, if the contact areas, where directly contact to a ship or quay at the time of use, and noncontact areas are clearly separated as the barrel-shaped fender 1 in this embodiment (refer to FIG. 4), it is preferable to provide the transponder 10 in the noncontact area in order to reduce shock to and prevent damage of the transponder 10.

Figure 5:
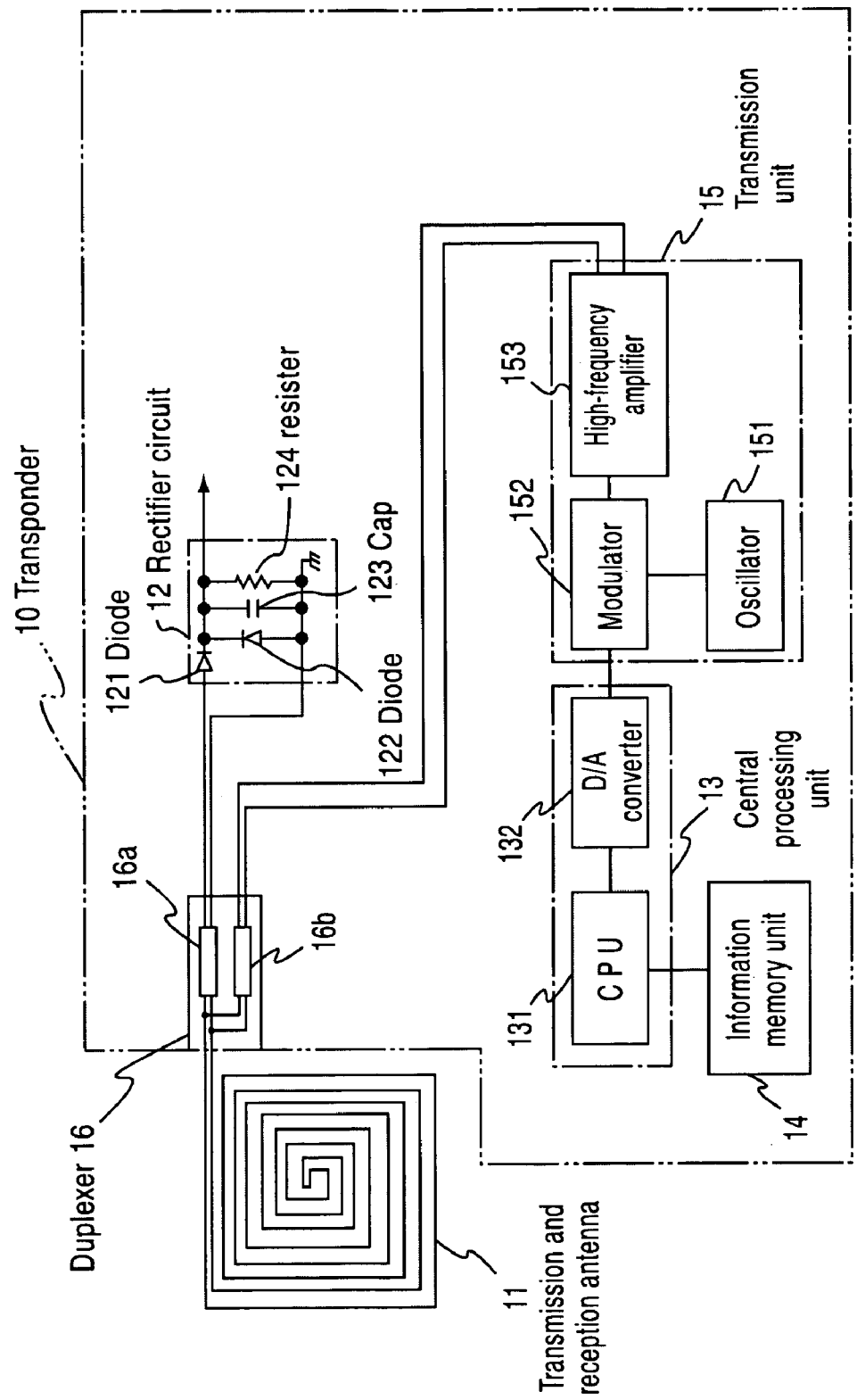
FIG. 5 is a block diagram showing electric circuits of the transponder in the first embodiment of the present invention.

FIG. 5 is a block diagram showing electric circuits of the transponder 10. In FIG. 5, symbol 10 shows the transponder, which is configured of a transmission and reception antenna 11, a rectifier circuit 12, a central processing unit 13, an information memory unit 14, a transmission unit 15, and a duplexer 16.

The rectifier circuit 12 is configured of diodes 121 and 122, a capacitor 123, and a resister 124, and forms a known full-wave rectifier circuit. The transmission and reception antenna 11 is connected to the input side of this rectifier circuit 12 through the duplexer 16, and this rectifier circuit 12 outputs rectified current as a driving power supply of the central processing unit 13, information memory unit 14, and transmission unit 15 by rectifying high-frequency current, induced in the transmission and reception antenna 11, and converting the induced current into direct current.

The central processing unit 13 is configured of a known CPU 131, and a digital/analog (hereinafter, this is called D/A) converter 132. When electric power is supplied to the CPU 131 and the CPU 131 becomes operable, the CPU 131 reads an ID code or identification information inherent in each transponder, which is stored in the information memory unit 14, and converts this digital data into analog data through the D/A converter 132 to output to the transmission unit 15.

The transmission unit 15 is configured of an oscillator 151, a modulator 152 and a high-frequency amplifier 153, and modulates a carrier wave, which is generated by the oscillator 151 and has a frequency of, for example, 300 MHz, in the modulator 152 on the basis of a signal inputted from the central processing unit 13 to supply this modulated carrier wave to the transmission and reception antenna 11 through the high-frequency amplifier 153 and duplexer 16.

The duplexer 16 is configured of a low-pass filter 16a and a high-pass filter 16b; the low-pass filter 16a is connected between the transmission and reception antenna 11 and rectifier circuit 12, and the high-pass filter 16b is connected between the transmission and reception antenna 11 and high-frequency amplifier 153.

Respective terminals 2A through 2D are provided not only in each of areas ($E_A$ through $E_C$) in a predetermined range, where fenders 1 that are objects to be managed are installed, but also in a ship S embarking fenders 1 that are object to be managed. Each terminal reads an ID code by accessing a transponder 10 mounted in the fender 1 and transfers historical information and the ID code in a lot as individual update information of the fender to the control system 4 by an operator inputting the historical information of this fender 1, regarding use, at that time such as installed places, installed periods, contents of repair, repaired locations, a storage location, and a storage period. When individual update information is transferred, a communication network such as the Internet, an ordinary telephone line, or a communication satellite is used.

Figure 6:
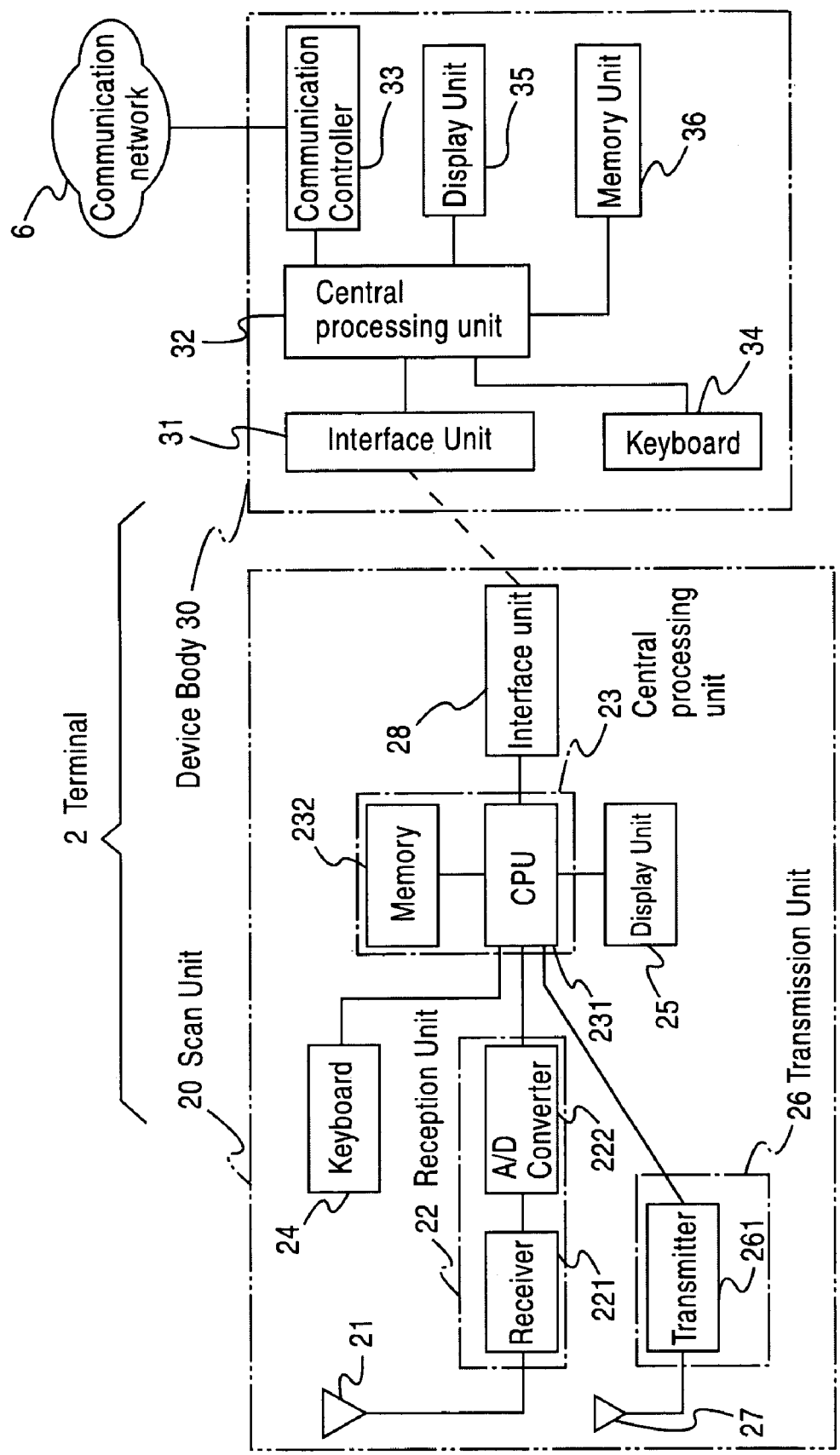
FIG. 6 is a block diagram showing electric circuits of a terminal in the first embodiment of the present invention.

FIG. 6 is a block diagram showing electric circuits of the terminal 2 (2A–2D). In FIG. 6, symbol 2 shows the terminal, which is configured of a scan unit 20 and a device body 30.

Figure 7:
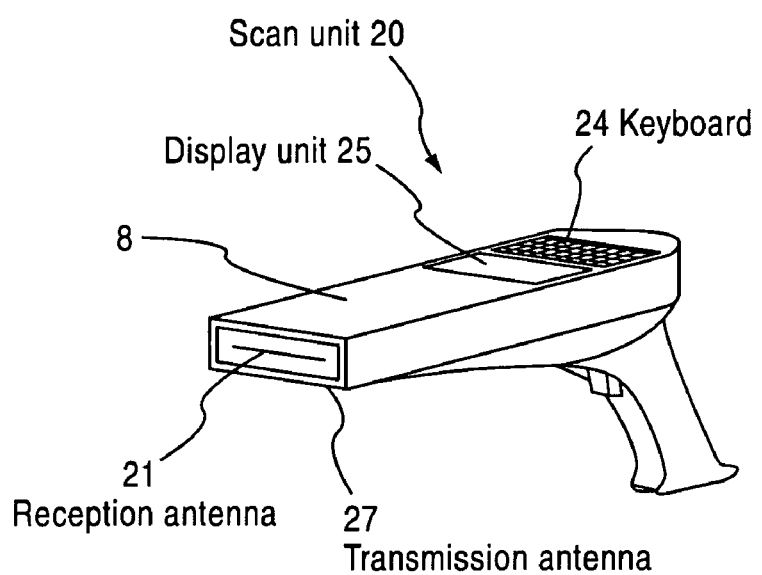
FIG. 7 is an outside view showing a scan unit in the first embodiment of the present invention.

The scan unit 20, as shown in FIG. 6, is composed of a reception antenna 21, a reception unit 22, a central processing unit 23, a keyboard 24, a display unit 25, a transmission unit 26, a transmission antenna 27, and an interface unit 28 for data transfer with the device body 30 in order to improve portability and operatability. The scan unit 20 is formed in, for example, a hand-held unit as shown in FIG. 7. In FIG. 7, the scan unit 20 is built in a pistol-shaped case 8, and the reception antenna 21 and transmission antenna 27 are installed in an end portion of the case 8; the keyboard 24 and display unit 25 are installed on the upper surface of the case 8. In this case, a battery or the like, which is not shown, is used as a power supply.

Here, the scan unit 20 in this embodiment is a unit that receives an ID code transmitted from a transponder 10 by receiving an electromagnetic wave having a second frequency while radiating an electromagnetic wave having a first frequency to the transponder 10 as described later.

In addition, the reception unit 22 in the scan unit 20 is configured by a receiver 221 and an analog/digital (hereinafter, this is called A/D) converter 222. The input side of the receiver 221 is connected to the reception antenna 21. The reception unit 22 receives and detects a 300-MKz high-frequency wave and then outputs the detected output to the central processing unit 23 through the A/D converter 222.

The central processing unit 23 is configured of a known CPU 231 and memory 232, and not only stores information inputted from the reception unit 22 in the memory 232, but also displays the information on the display unit 25 on the basis of an input command from the keyboard 24. Furthermore, the central processing unit 23 not only stores the historical information of a fender 1, inputted from the keyboard 24, in the memory 232 in a one-to-one correspondence between the historical information and the ID code read, but also transfers the information stored in the memory 232 to the device body 30 through the interface unit 28 on the basis of the input command from the keyboard 24.

In addition, a transmission unit 26 is configured of a transmitter 261, and the transmitter 261 outputs a high-frequency signal of, for example, 100–300 KHz to the transmission antenna 27 on the basis of a control signal from the CPU 231.

The device body 30 is configured of an interface unit 31, a central processing unit 32, a communication controller 33, a keyboard 34, a display unit 35 and memory unit 36.

The interface unit 31 is used when the information stored in the scan unit 20 is transferred to the device body 30 and configured of RS232c or infrared communication connection such as IRDA; and it has components similar to those of the interface unit 28 in the scan unit 20.

The central processing unit 32 is configured of a known CPU or the like, and receives information from the scan unit 20 through the interface unit 31 on the basis of a command, inputted by the keyboard 34, to store this information in the memory unit 36. In addition, the central processing unit 32 not only updates the information stored in the memory unit 36, but also generates individual update information in regard to an updated part to transmit this information to the control system 4 through the communication controller 33 if the information inputted from the scan unit 20 is different from the information stored in the memory unit 36.

The individual update information is made up of a serial number, the historical information updated, or the like for the fender 1 which is an object to be managed. The central processing unit 32 converts the ID code of the transponder, which is transferred from the scan unit 20, into the serial number on the basis of a corresponding table which is beforehand stored in the memory unit 36.

In the corresponding table, the ID code of the transponder 10 and the serial number of the fender 1 having this transponder 10 are listed in a one-to-one correspondence between them. Even if a plurality of transponders 10 are mounted in a fender 1, it is possible to easily extract the serial number of the fender 1 having these transponders 10.

The communication controller 33 performs information transfer with the control system 4 through a communication network 6 (6A–6D) such as the internet, ordinary telephone lines, wireless communication, and communication satellite.

The display unit 35 is configured of a monitor, connected to the central processing unit 32, or the like, and is used for displaying a processing information, processed in the central processing unit 32, and a memory information stored in the memory unit 36.

Figure 8:
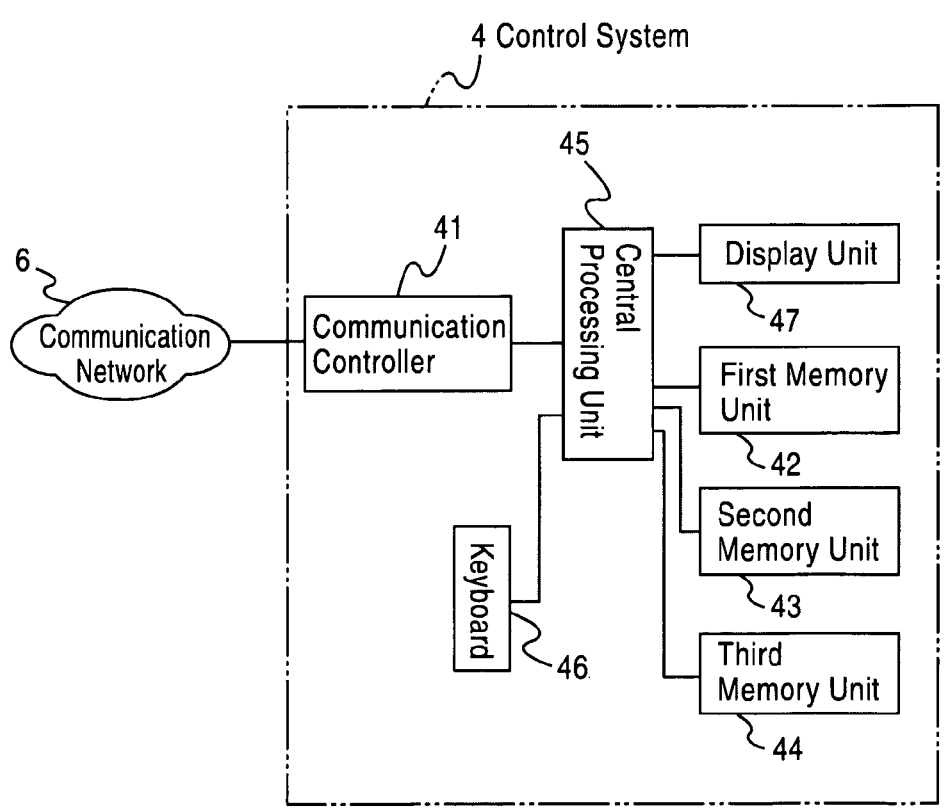
FIG. 8 is a block diagram showing electric circuits of a control system in the first embodiment of the present invention.

The control system 4, as shown in FIG. 8, is configured of a communication controller 41, a first memory unit 42, a second memory unit 43, a third memory unit 44, a central processing unit 45, a keyboard 46, and a display unit 47.

The communication controller 41, similarly to that in the terminal 2, performs information transfer with the terminal 2 through the communication network 6 (6A–6D) such as the internet, ordinary telephone lines, or communication satellite.

Manufacturing information of each fender 1 is stored in the first memory unit 42. As shown in FIG. 9, for example, rated dimensions, initial internal pressure, a model, cover structure, a manufacturing date, a customer name, a test report, manufacturing specifications, and remarks, which are corresponding to a serial number, are stored as the manufacturing information. Furthermore, manufacturing drawings such as an assembly drawing, used in manufacturing of the fender 1, are stored with corresponding to the serial number.

The second memory unit 43 stores historical information of each fender 1. As the historical information, an initial installation date, an initial installed place, use records, check and inspection records, repair records, remarks, and the like, which are corresponding to the serial number, are stored as shown in, for example, FIG. 10.

As the use records, installed places and installed periods, which are results of changes after the initial installation, are recorded. As the check and inspection records, implemented dates of checks and inspections and their results are recorded. In addition, as the repair records, implemented dates of repairs, repaired parts, are recorded.

The third memory unit 44 stores a plurality of data of maps of all the installation areas $E_A$ through $E_C$, where the fenders 1 are installed, for example, maps, which are drawn over from wide ranges to narrow ranges every area, and aerial photographs.

The central processing unit 45 is configured of a known CPU or the like. The central processing unit 45 receives the individual update information, which is transferred from the terminal 2, through the communication controller 41, and performs update processing of the historical information stored in the first memory unit 42. Furthermore, the central processing unit 45 displays the manufacturing information, historical information, or map of the installed place of the fender 1 designated by a serial number on the basis of an operator's instruction (command), inputted with the keyboard 46, on the display unit 47. Furthermore, the central processing unit 45 performs processing of correction and addition of the stored information according to an operator's command input from the keyboard.

Next, an operation method and operation of the management system having the above configuration will be described.

When this management system is used, manufacturing information of the fenders 1 that are objects to be managed, historical information at the time of operation start, and data such as maps and aerial photographs of an area where the fenders 1 are installed are stored in the control system 4 at the time of operation start. The information and data can be inputted by the control system 4 itself, or can be stored by transferring the information and data, inputted in the terminal 2, to the control system 4. Furthermore, the corresponding table described above is stored in each terminal 2.

On the other hand, if the fender 1 is newly supplemented or moved to another installed place after the operation starts, the information stored in the control system 4 is added or updated. In addition, if the fender 1 is newly supplemented or annulled, it is necessary to update also the corresponding table in each terminal 2.

If the historical information of the fender 1 is updated in each of installed places $E_A$–$E_C$, the ID code of the transponder 10 mounted in the fender 1 that is an object whose information is to be updated is read by using only the scan unit 20 in the terminal 2. After historical information is inputted, this information is transferred to the device body 30.

When the ID code of the transponder 10 is read, the distance between the scan unit 20 and transponder 10 is set within predetermined distance, and a read command is inputted from the keyboard 24 of the scan unit 20. Thereby, the transmitter 26 is driven on the basis of an operating program in the CPU 231 in the scan unit 20, and the high-frequency signal of the first frequency or the high-frequency signal of 100–300 KHz is radiated from the transmission antenna 27.

This electromagnetic wave is inputted to the transmission and reception antenna 11 of the transponder 10, and high-frequency current is induced in the transmission and reception antenna 11. The high-frequency current induced in the transmission and reception antenna 11 is rectified by the rectifier circuit 12 to supply electric power to the central processing unit 13, information memory unit 14, and transmission unit 15 inside the transponder 10.

Thereby, the central processing unit 13, to which the electric power is supplied while receiving the electromagnetic wave transmitted from the scan unit 20, performs information transmission processing, programed beforehand. Thus, the central processing unit 13 outputs the ID code, stored in the information memory unit 14, to the transmission unit 15. The transmission unit 15 modulates a carrier wave on the basis of this ID code, and supplies the modulated carrier wave or a high-frequency signal to the transmission and reception antenna 11. Thereby, an electromagnetic wave of the second frequency or an electromagnetic wave having the frequency of 300 MHz is radiated from the transmission and reception antenna 11.

The scan unit 20 receives the electromagnetic wave of 300 MHz, which is radiated from the transponder 10, by the reception unit 22 through the reception antenna 21, and the reception unit 22 converts the received ID code into digital data, and transmits the digital data to the central processing unit 23.

The central processing unit 23 not only displays the ID code, which is based on the inputted digital data, on the display unit 25, but also stores the ID code in the memory 232.

Next, an operator inputs the historical information of the fender 1, from which the ID code is read, at that time, for example, the historical information such as an installed place and an installed period after change by operating the keyboard 24 of the scan unit 20.

Thereby, the central processing unit 23 of the scan unit 20 stores the historical information in the memory 232 which is associated with the ID code previously read. If the historical information of plural fender 1 is updated, operation described above can be repeated.

After this, the operator brings the scan unit 20 back to the installed place of the device body 30, and transfers the information, stored in the memory 232 of the scan unit 20, to the device body 30. Thereby, the central processing unit 32 of the device body 30 not only updates the information stored in the memory unit 36, but also generates the individual update information, described above, on a part updated, and transmits this information to the control system 4 through the communication controller 33 if the information transferred from the scan unit 20 is different from the information stored in the memory unit 36.

Therefore, the control system 4, which receives the individual update information, updates the information stored. In addition, if an operator wants to know the manufacturing information, including the manufacturing drawings and the historical information of a specific fender, or to see maps or aerial photographs of an area where the installed place is included, the operator can display this information on the display unit 47 by inputting a command from the keyboard 46.

Furthermore, an installation state of the fender 1 in the area designated by the operator is displayed by displaying the installed place of the fender 1 with superimposing a symbol and its serial number on a map or an aerial photograph of the designated area.

As described above, according to the first embodiment, it is possible to exactly manage the fender 1 that is an object to be managed.

In addition, since this management system performs information transfer between the terminal 2 and control system 4 through the communication network 6, it is possible to update management information in real time without depending on distance between these installed places.

Furthermore, an ID code inherent in each transponder 10 is stored in the information memory unit 14 of the transponder 10 mounted in the fender 1, and the ID code is converted into a serial number of the fender 1 by the terminal 2 having read this, and thereafter the fender is managed with being identified with the serial number. Therefore, it is possible to easily perform association with manufacturing information.

In addition, the transponder 10 is mounted in the fender 1, and an ID code is automatically read by accessing the transponder 10; each fender 1 is designated by this ID code. Hence, it is possible to not only simplify management work, but also prevent an artificial error on management.

Furthermore, an electromagnetic wave radiated from the scan unit 20 is converted into electrical energy in the transponder 10, and the transponder 10 operates by means of this electrical energy. Therefore, the transponder 10 can be semipermanently operated, and hence it is possible to simplify the maintenance of the transponder 10.

Moreover, since it is possible to display the manufacturing drawings of each fender 1 by operator's designated input in the control system 4, it is possible to repair the fender 1 on the basis of the manufacturing drawings displayed if urgent repair is necessary. In addition, since it is possible to display a map or a photograph of an installed place of an arbitrary fender 1 and its vicinity in the control system 4 by operator's command input, it is possible to easily grasp the place of each fender 1 at the time of maintenance or the like.

Furthermore, since it is possible to display an installation state of the fenders 1 in an arbitrary area among areas $E_A$ through $E_C$ in the control system 4 by operator's command input, it is possible to easily perform a movement plan such as change of an installed place of the fenders 1.

Next, a second embodiment of the present invention will be described.

The system configuration of the second embodiment is almost similar to the above-mentioned first embodiment. A difference between the first and second embodiments is that, in the second embodiment, the fender 1 itself has the historical information of the fender 1 by making the transponder 10 have a function of writing information to the information memory unit 14, and that an ID code is converted into a serial number in the control system 4 by making the control system 4 have a corresponding table.

Hereinafter, the difference from the first embodiment will be described.

Figure 11:
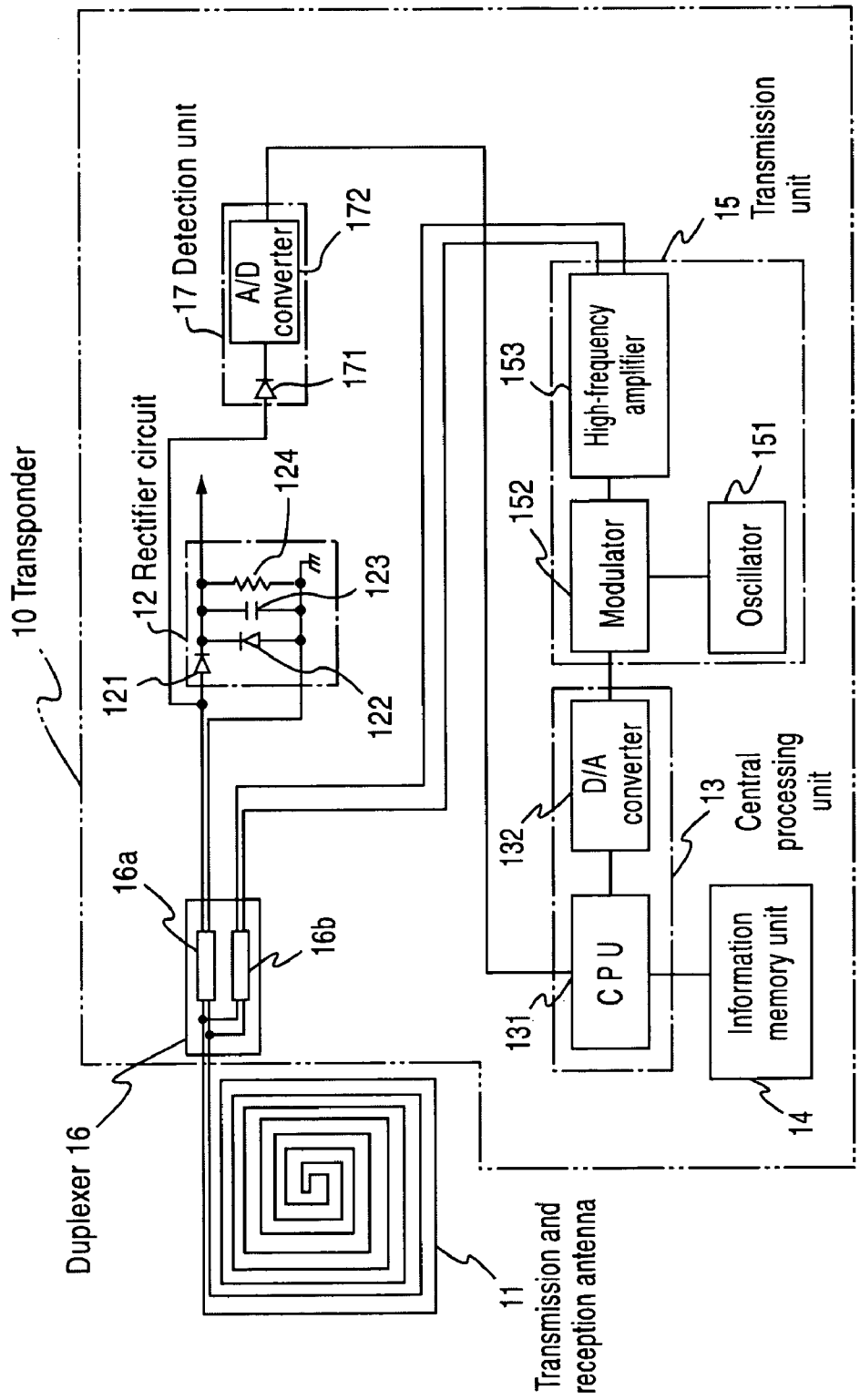
FIG. 11 is a block diagram showing electric circuits of a transponder in a second embodiment of the present invention.

FIG. 11 is a block diagram showing electric circuits of the transponder 10 in the second embodiment. In FIG. 11, the same symbols are assigned to the same components in the first embodiment, and their description is omitted. In addition, the difference between the first and second embodiments is that a detection unit 17 is provided in the transponder 10, and the information memory unit 14 is configured of nonvolatile memory, which is readable and writable, such as EEPROM; the central processing unit 13 has a function of writing information to the information memory unit 14.

Thus, the detection unit 17 is configured of a diode 171 and an A/D converter 172, the anode of the diode 171 is connected to the reception antenna 11, and the cathode is connected to the CPU 131 of the central processing unit 13 through the A/D converter.

The information memory unit 14 is configured of semiconductor memory such as EEPROM connected to the CPU 131, and an ID code inherent in the transponder 10 is stored beforehand in this information memory unit 14.

Figure 12:
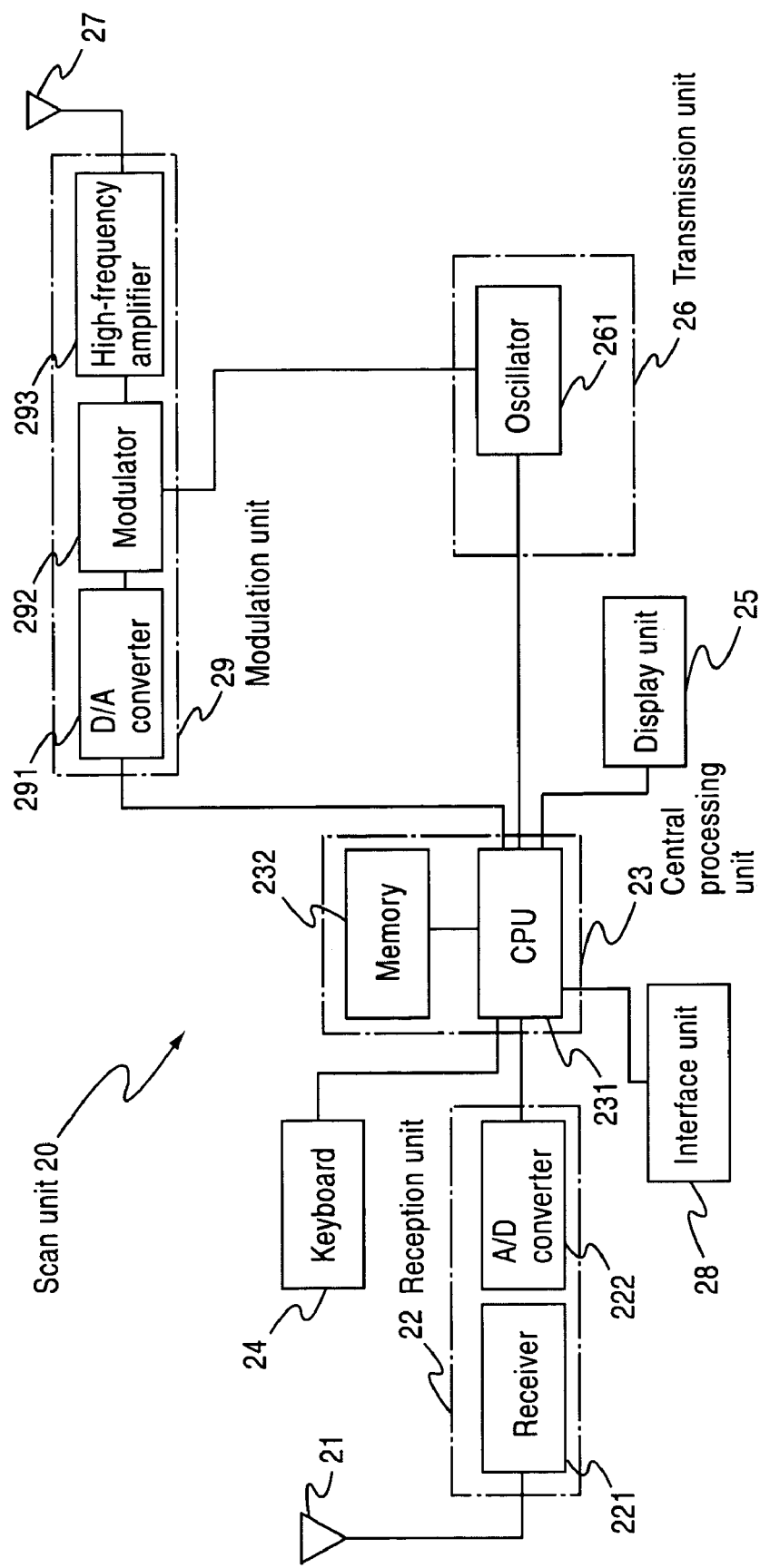
FIG. 12 is a block diagram showing electric circuits of a scan unit in the second embodiment of the present invention.

FIG. 12 is a block diagram showing electric circuits of the scan unit 20 in the terminal 2. In FIG. 12, the same symbols are assigned to the same components in the first embodiment, and their description is omitted. In addition, a difference between the first and second embodiments is that, in the second embodiment, historical information inputted from the keyboard can be transmitted to the transponder 10 by providing a modulation unit 29 in the scan unit 20.

Thus, the modulation unit 29 is configured of a D/A converter 291, a modulator 292 and a high-frequency amplifier 293, and the input side of the D/A converter 291 is connected to the CPU 231 in the central processing unit 23; the output side is connected to the modulator 292. The modulator 292 receives a carrier wave from the transmission unit 26, and modulates this to supply this to the high-frequency amplifier 293. The high-frequency amplifier 293 amplifies the inputted high-frequency signal and outputs the signal to the transmission antenna 27.

In addition, the device body 30 in the terminal 2 does not store an ID code of the transponder 10 and a corresponding table where the serial number of the fender 1 equipped with the transponder 10 is listed by associating the serial number with the ID code. Nevertheless, the control system 4 stores the corresponding table and converts the ID code into the serial number.

According to the configuration described above, when the historical information of a fender 1 is updated in each of installed places $E_A$ through $E_C$, first, the ID code of the transponder 10 mounted in the fender 1, that is an object whose information is to be updated, is read by using only the scan unit 20 in the terminal 2. Furthermore, historical information to be added is inputted. After this operation, by inputting an information write command from the keyboard 24 of the scan unit 20, the historical information of the fender 1, which is inputted to the scan unit 20, is additionally written in the information memory unit 14 of the transponder 10. Thereby, it is possible to hold the historical information of the fender 1 on the fender itself.

In addition, when an operator wants to know the historical information stored in the information memory unit 14 of the transponder 10, it is possible to display the historical information on the display unit 25 of the scan unit 20 by receiving the historical information since the historical information, stored in the information memory unit 14, is transmitted from the transponder 10 by transmitting an information read command from the scan unit 20 to the transponder 10.

Next, similarly to the first embodiment, an ID code, stored in the memory 232 of the scan unit 20, and historical information corresponding to this are transferred to the device body 30.

Thereby, the central processing unit 32 in the device body 30 not only updates the information stored in the memory unit 36, but also generates the individual update information, described above, on a part updated, and transmits this individual update information to the control system 4 through the communication controller 33 if the information transferred from the scan unit 20 is different from the information stored in the memory unit 36.

At this time, the central processing unit 32 generates the individual update information including the ID code of the transponder 10 and historical information corresponding to this and transmits the individual update information.

The control system 4, which receives this individual update information, converts the ID code into a serial number on the basis of the corresponding table, and thereafter updates the stored information on the basis of this serial number.

In addition, if an operator wants to know the manufacturing information and historical information of a specific fender, or to see maps and aerial photographs of an area where the installed place is included, which is similarly to the first embodiment, the operator can display this information on the display unit 47 by inputting a command from the keyboard 46.

As described above, according to the second embodiment, similarly to the first embodiment, it is possible to not only exactly manage the fender 1 that is an object to be managed, but also allow the information memory unit 14 of the transponder 10 to hold the historical information of the fender 1. Therefore, it is possible to easily know the historical information of the fender 1 without using any control system 4.

In addition, by making the control system 4 hold the corresponding table, it is possible to reduce the load of processing in the terminal 2, and hence it is possible to perform down sizing and cost reduction of the terminal.

In addition, in the first and second embodiments described above, a fender 1 is managed with making a serial number a reference by converting an ID code into the serial number of the fender 1 on the basis of the ID code stored beforehand in a transponder 10. Alternatively, it can be performed that conversion processing using a corresponding table is omitted by storing a serial number of a fender 1, which is an object to be mounted, in a transponder 10 beforehand. This method, however, requires work of writing the serial number into the transponder 10.

In addition, a fender 1 can be also managed by using an ID code in a transponder 10 in the control system 4 without using any corresponding table. However, if two or more transponders 10 are mounted in one fender 1, this method has a demerit of becoming complicated in many cases.

Furthermore, in the embodiments described above, although the terminal 2 is configured of the detachable scan unit 20 and the device body 30, a terminal 2 can be configured by integrating the scan unit 20 and device body 30.

Figure 13:
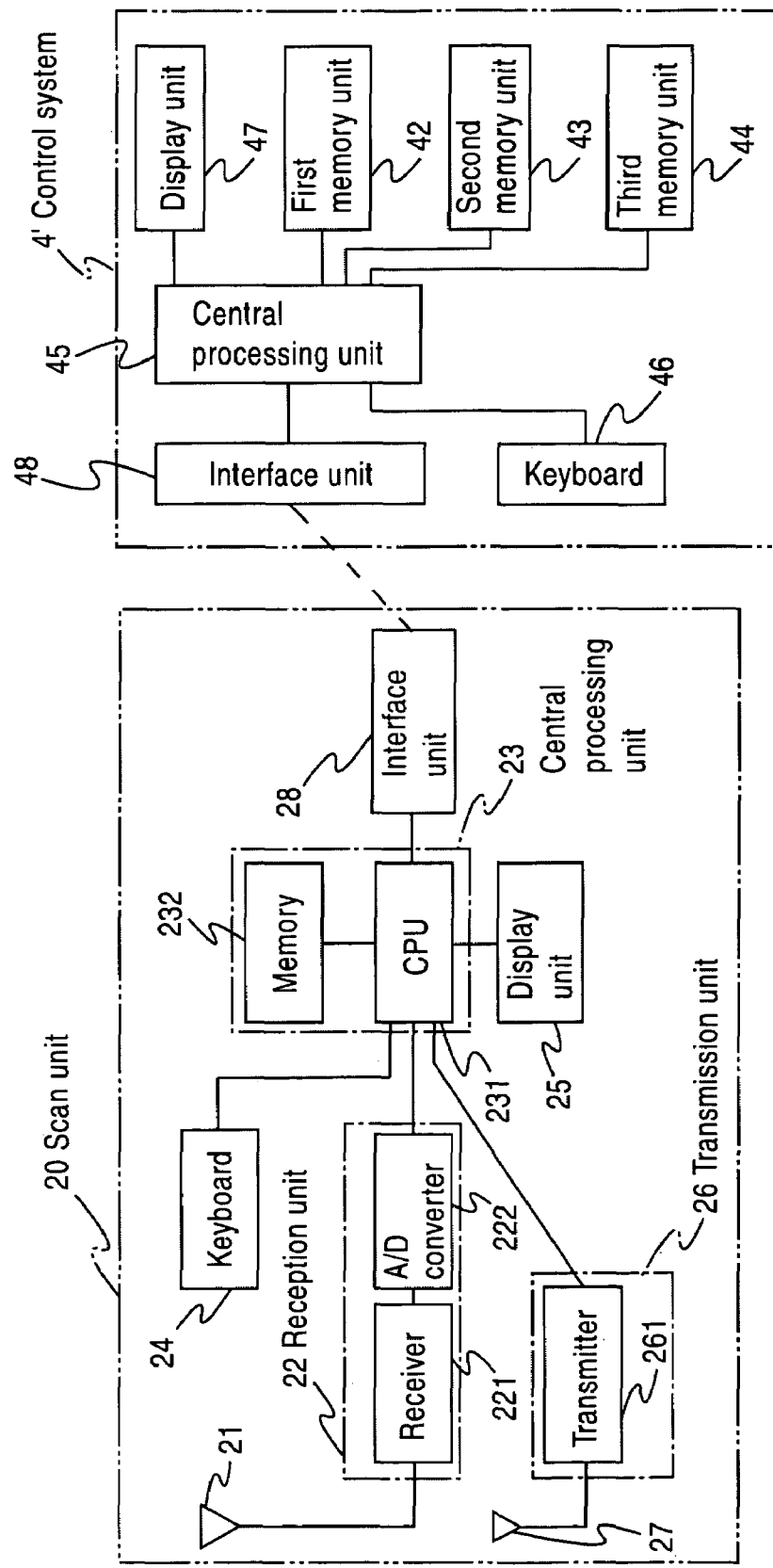
FIG. 13 is a block diagram showing electric circuits of a control system in another embodiment.

Moreover, a pair of the terminal 2 and control system 4 can be also installed in each area where a fender 1 is installed. Thus, in the first and second embodiments described above, the management system is a system managing fenders 1, which are installed in a plurality of areas ($E_A$–$A_C$), in a lot. However, the present invention is not limited to this. The management system can be a system managing a plurality of fenders 1 existing in only one area. In this case, for example, as shown in FIG. 13, it is possible to simplify the configuration and realize this system by deleting the device body 30 of the terminal 2 and installing a control system 4', which is comprising an interface unit 48 with the scan unit 20, in the area.

In addition, by expanding memory capacity of the scan unit 20, it is also possible to manage a fender 1 using only a terminal composed of only the scan unit 20 without using a control system. However, in this case, management information is limited in some measure.

Figure 14:
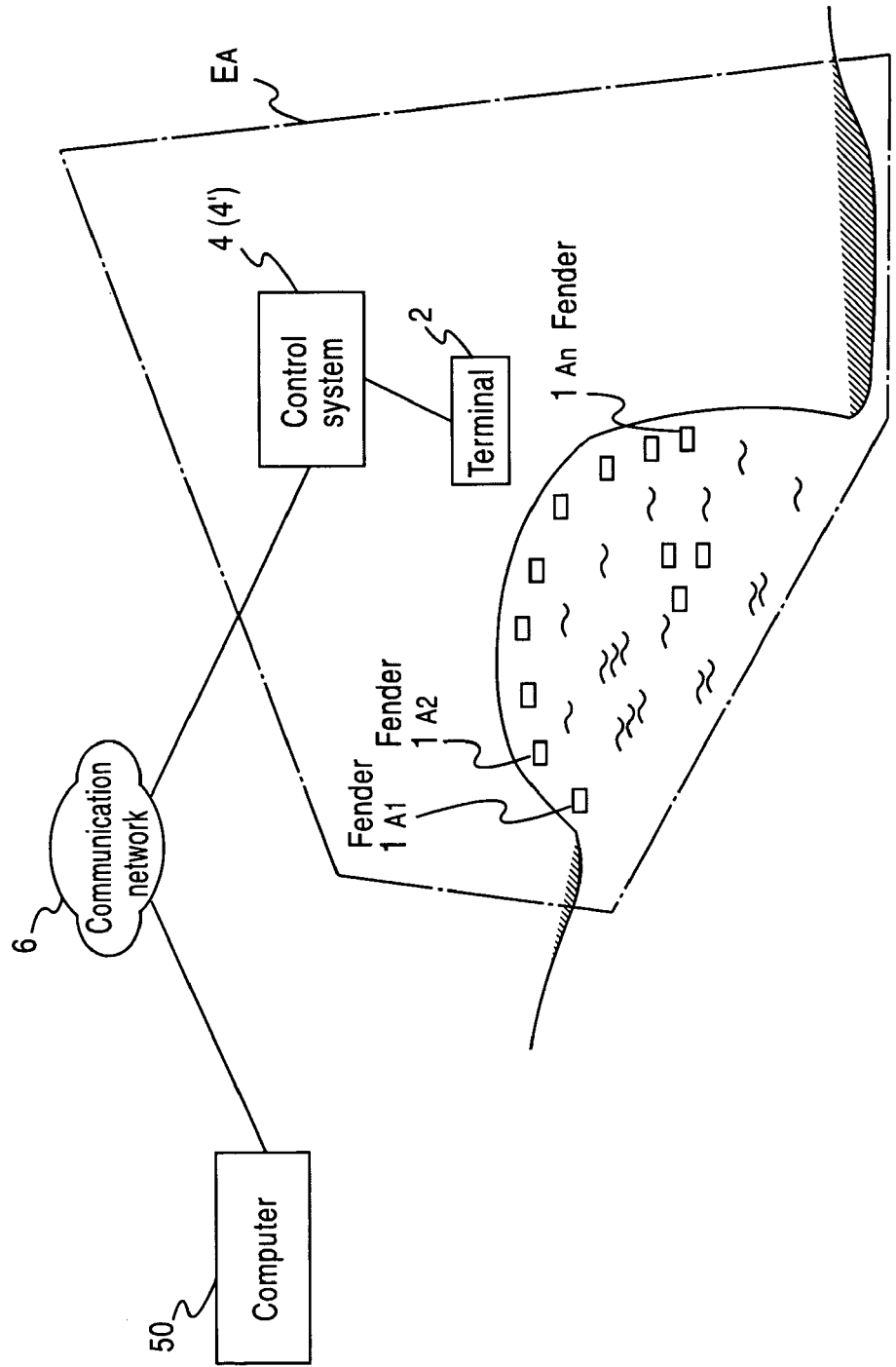
FIG. 14 is a block diagram showing a fender management system in another embodiment.

Furthermore, as shown in FIG. 14, it can be performed to communicate through the communication network 6 between a computer 50, which is installed in a manufacturing company or the like of a fender 1 and stores manufacturing information of the fender, and the control system 4 or 4', and to use information by transferring from the computer 50 the information necessary in the control system 4 or 4'.

Moreover, it goes without saying that it can be also performed to install a plurality of terminals 2 or a plurality of control systems 4 or 4' in an area and use these at the same time.

Figure 15:
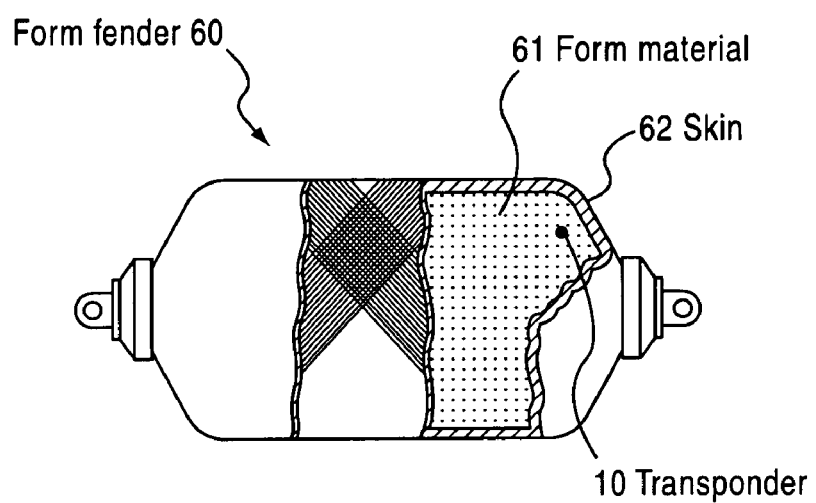
FIG. 15 is a partially broken side view showing a foam fender.

In addition, in the first and second embodiments, although a pneumatic fender is exemplified, it goes without saying that the present invention can be applied to a rubber fender or a foam fender 60 shown in FIG. 15, and similar effects can be obtained. Since foam material 61 is filled in the foam fender 60 shown in FIG. 15, a position where a transponder 10 is mounted, can be comparatively freely selected. However, in order to adequately perform communication by an electromagnetic wave, it is preferable to install the transponder 10 near to a skin 62.

The present invention can be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

INDUSTRIAL APPLICABILITY

A transponder is mounted in a fender 1 that is an object to be managed, and an ID code is read by accessing the transponder in the fender 1 with terminals 2A through 2D, one or more of which are provided in each of areas that are objects to be managed; individual update information including historical information, which shows installed places and installed periods of the fender 1, and the ID code is transferred to the control system 4 through communication networks 6A through 6D. The control system 4 not only stores manufacturing information and historical information of all the fenders 1 that are objects to be managed, but also updates the historical information on the basis of the individual update information received from the terminal 2 to display the manufacturing information and historical information of a specific fender 1 designated by an operator. Thereby, it is possible to manage each fender by using the information obtained by accessing the transponder. Hence, it is possible to not only prevent a human error on management, but also simplify management work since it is possible to access the transponder even from a position where is apart from the fender in some measure. Furthermore, it is possible to not only grasp the historical information such as the installed place and installed period of the fender immediately and exactly, but also update management information in real time without depending on distance between installed places.

The invention claimed is:

1. A fender, comprising:
   a fender body including a skin member formed generally in a barrel shape and having a cylindrical portion as a contact area and a pair of disk portions integrally connected at opposing ends of the cylindrical portion as non-contact areas, a rubber-coated cord layer embedded in the skin member, a bead ring embedded in the rubber-coated cord layer at a selected one of the pair of disk portions of the fender body and surrounding a cavity formed into a central portion of the selected disk portion and a filler hole assembly disposed in the cavity;
   a transponder, which includes information memory means for storing predetermined information, the transponder embedded in the selected disk portion adjacent the bead ring; and
   information read means for reading information stored in the information memory means,
   wherein said transponder can provide wireless access to the information read means.

2. The fender according to claim 1, wherein the said transponder comprises information write means for wirelessly writing information into the information memory means.

3. The fender according to claim 1, wherein the said transponder further comprises:
   reception means for receiving an electromagnetic wave having a first frequency;
   energy conversion means for converting energy of the electromagnetic wave, received by the reception means, into electric energy; and
   transmission means for transmitting information, read from the information memory means by said information read means, by an electromagnetic wave having a second frequency, wherein the transponder operates by electric energy obtained by said energy conversion means.

4. The fender according to claim 1, wherein predetermined information stored in said information memory means includes at least identification information, which is inherent in each fender, for identifying the fender.

5. The fender according to claim 1, wherein the predetermined information stored in said information memory means includes at least identification information, which is inherent in each transponder, for identifying the transponder mounted in the fender.

6. The fender according to claim 1, wherein said information includes manufacturing information and/or historical information of the fender.

7. The fender according to claim 1, wherein the fender is a floating fender floating on the water.

8. The fender according to claim 1, wherein the fender body has a shape having a contact area that is subject to contacting to a shock object giving shock during use, and each one of the noncontact areas is not subject to contacting to the shock object.

9. A fender management system comprising:
   a fender according to claim 1; and
   a terminal, wherein the terminal comprises:
   information read means for accessing information memory means of a transponder provided in said fender and reading information stored in the information memory means of the transponder; and
   at least information display means for displaying the information read from the information memory means of the transponder in said fender.

10. A fender management system comprising:
    a fender according to any one of claim 1;
    a terminal that is capable of wirelessly accessing information memory means of the transponder, provided in the fender;
    a control system that can communicate with the terminal, and stores information inherent in each fender, which is obtained through the terminal and corresponding to each fender; and
    a computer that can communicate with the control system, wherein said control system reads information from the information memory means of said transponder through said terminal; and wherein said control system further reads information of the fender, which is stored in said computer, by communicating with said computer, receives information of each fender from the computer, and manages the fender on the basis of this information.

11. The fender management system according to claim 10, wherein communication between said control system and computer is performed through a communication network.

12. A fender management system comprising a fender according to claim 1, a terminal, and a control system, wherein said terminal communicates with a transponder, provided in the fender, by wireless, and transfers information, which the transponder transmits, to the control system; wherein said control system comprises:
    information memory means for storing information of the fender that is an object to be managed;
    reception means for receiving information, which said transponder transmits, from said terminal;
    information update means for updating information, which the information memory means stores, on the basis of the received information; and information display means for displaying information of a fender that an operator designates.

13. The fender management system according to claim 10, wherein communication between the said terminal and control system is performed through a communication network.

14. The fender management system according to claim 9 or 10, wherein said terminal comprises information write means for writing information into information memory means of said transponder.

15. The fender management system according to claim 10, wherein the information memory means of said transponder stores at least identification information inherent in each fender; wherein said terminal reads and transmits identification information inherent in each fender to a control system; and wherein said control system stores information inherent in a fender, which is an object to be managed, in a one-to-one correspondence between the inherent information and the identification information.

16. The fender management system according to claim 10, wherein the information memory means of said transponder stores at least identification information inherent in each transponder; wherein said terminal has a corresponding table associating identification information inherent in each transponder with a serial number of a fender where the transponder is mounted, and conversion means for converting identification information inherent in a transponder into a serial number of a fender on the basis of the corresponding table, converts identification information inherent in a transponder, which is read from the transponder, into a serial number of a fender, and transmits the serial number to said control system; and wherein said control system stores information inherent in a fender in a one-to-one correspondence with the serial number.

17. The fender management system according to claim 10, wherein the information memory means of a said transponder stores at least identification information inherent in each transponder; wherein said terminal has a corresponding table associating identification information inherent in each transponder with a serial number of a fender in which the transponder is mounted, and conversion means for converting identification information inherent in a transponder into a serial number of a fender on the basis of the corresponding table, and stores information inherent in a fender in a one-to-one correspondence between the inherent information and said serial number.

18. The fender management system according to claim 10, wherein the information, which the said computer stores, includes specifications, structure, characteristics, and manufacturing information of each fender.

19. The fender management system according to claim 10, wherein said information of a fender includes manufacturing drawings.

20. The fender management system according to claim 10, wherein said control system comprises installation state display means for displaying an installation state of fenders in a specific area where an operator designates.

21. The fender management system according to claim 10, wherein said information of the fender includes an installed place of the fender, which is an object to be managed, and a map or a photograph or its vicinity; and wherein said control system comprises installed place display means for displaying an installed place of a specific fender, which an operator designates, and a map or a photograph of its vicinity.

22. The pneumatic fender according to claim 1, wherein the skin member is fabricated from a rubber material.

23. The pneumatic fender according to claim 22, wherein the rubber material is a rubber tube.

24. A pneumatic fender that is used as cushioning material for a ship with the pneumatic fender being fixed to an underwater structure or floated, the pneumatic fender comprising:
a fender body including a skin member formed generally in a barrel shape and having a cylindrical portion as a contact area and a pair of disk portions integrally connected at opposing ends of the cylindrical portion as non-contact areas, a rubber-coated cord layer embedded in the skin member, a bead ring embedded in the rubber-coated cord layer at a selected one of the pair of disk portions of the fender body and surrounding a cavity formed into a central portion of the selected disk portion and a filler hole assembly disposed in the cavity;
a transponder, which includes information memory means for storing predetermined information, the transponder embedded in the selected disk portion adjacent the bead ring; and
information read means for reading information stored in the information memory means,
wherein said transponder can provide wireless access to said information read means.

25. The pneumatic fender according to claim 24, wherein said transponder comprises:
reception means for receiving an electromagnetic wave having a first frequency;
energy conversion means for converting energy of the electromagnetic wave, received by the reception means, into electric energy; and
transmission means for transmitting information, read from the information memory means by said information read means, by an electromagnetic wave having a second frequency, wherein the transponder operates by electric energy obtained by said energy conversion means.

26. The pneumatic fender according to claim 24, wherein the fender body has a shape having a contact area that is subject to contacting a shock object giving shock during use, and each one of the non-contact areas is not subject to contacting the shock object.

27. The pneumatic fender according to claim 24, wherein said transponder is located inside a tegument surface of the fender body.

28. The pneumatic fender according to claim 24, wherein the skin member is fabricated from a rubber material.

29. The pneumatic fender according to claim 28, wherein the rubber material is a rubber tube.

* * * * *